United States Patent [19]

Doi et al.

[11] Patent Number: 4,858,677
[45] Date of Patent: Aug. 22, 1989

[54] AUTOMOBILE AIR-CONDITIONING APPARATUS WITH AIR BLOWER CONTROL

[75] Inventors: Shigetoshi Doi; Yoshiaki Nagayama, both of Hiroshima; Katsumi Iida; Yoshihiko Sakurai, both of Saitama, all of Japan

[73] Assignees: Mazda Motor Corporation; Diesel Kiki Co., Ltd., both of Japan

[21] Appl. No.: 61,268

[22] Filed: Jun. 12, 1987

[30] Foreign Application Priority Data

Jun. 18, 1986 [JP] Japan ................................ 61-140185

[51] Int. Cl.⁴ ............................................. F25B 29/00
[52] U.S. Cl. ........................................ 165/12; 165/16; 165/39; 165/40; 165/43; 236/49.1; 236/46 F; 98/2.01
[58] Field of Search ...................... 165/12, 16, 39, 40, 165/42, 43; 236/49, 13, 46 F; 62/158; 98/201

[56] References Cited

U.S. PATENT DOCUMENTS

| | | | |
|---|---|---|---|
| 4,358,050 | 11/1982 | Naganoma et al. | 236/13 |
| 4,401,149 | 8/1983 | Iijima et al. | 165/12 |
| 4,407,446 | 10/1983 | Iijima et al. | 165/16 |
| 4,408,713 | 10/1983 | Iijima et al. | 165/12 |
| 4,416,324 | 11/1983 | Sutoh et al. | 165/12 |
| 4,434,932 | 3/1984 | Hara et al. | 165/43 |
| 4,498,309 | 2/1985 | Kobayashi et al. | 236/49 D |
| 4,580,620 | 4/1986 | Fukumoto et al. | 165/12 |
| 4,602,675 | 7/1986 | Kobayashi | 165/16 |
| 4,604,873 | 8/1986 | Ohashi et al. | |
| 4,685,508 | 8/1987 | Iida | 165/17 |

FOREIGN PATENT DOCUMENTS

| | | | |
|---|---|---|---|
| 0023740 | 2/1982 | Japan | 62/158 |
| 0030610 | 2/1982 | Japan | 236/49 D |
| 0211253 | 10/1985 | Japan | 236/49 D |

*Primary Examiner*—Albert W. Davis, Jr.
*Assistant Examiner*—John K. Ford
*Attorney, Agent, or Firm*—Wenderoth, Lind & Ponack

[57] ABSTRACT

An automobile air-conditioning apparatus with air blower control air-conditions the passenger compartment of an automobile by cooling and/or heating air delivered from an air blower into the compartment. During a period in which the compartment starts being cooled, the rate of air flow form the air blower is progressively increased up to an air flow rate in an automatic temperature adjusting mode. The gradient at which the air flow rate is increased is selected dependent on the amount of sunlight applied to the automobile, the temperature of air in the compartment, and the temperature of air at the outlet of an evaporator.

3 Claims, 6 Drawing Sheets

AUTOMOBILE AIR-CONDITIONING APPARATUS WITH AIR BLOWER CONTROL

BACKGROUND OF THE INVENTION

The present invention relates to an automobile air-conditioning apparatus with air blower control for air-conditioning the interior passenger compartment of an automobile, and more particularly to an automobile air-conditioning apparatus with air blower control for optimizing control of the amount of air fed from an air blower when the compartment starts to be cooled.

Automobile air-conditioning apparatus has heretofore been employed to air-condition an automobile passenger compartment and also prevent the front windshield from getting fogged for thereby giving the driver clear visibility through the front windshield to allow the driver to drive the automobile with safety. In automobile air-conditioning apparatus, a voltage to be applied to an air blower motor is computed or found from a memory table according to a predetermined control pattern related to the difference between a detected compartment temperature and a preset compartment air temperature and based on the air temperature at an evaporator outlet, the amount of sunlight applied to the compartment, the ambient air temperature, etc. The determined motor voltage is then applied to the air blower motor for controlling the rate of air flow from the air blower.

When starting to cool the compartment, a large amount of hot air may be discharged into the compartment since the evaporator is not yet sufficiently cooled, or a bad odor may be produced due to contamination of the evaporator. To prevent such problems, it has been customary to provide an air blower driver circuit composed of the air blower motor, an air flow rate selector switch, and an air flow rate limiting resistor which are connected in series, with a breeze control unit composed of a resistor and a relay contact of a relay having a normally closed contact, the resistor and the relay contact being connected parallel to each other. When the air blower starts to be operated, the relay coil of the relay is energized for a certain period of time by a timer, so that the amount of air discharged by the air blower is limited to a breeze level over a period of time preset by the timer after the compartment has started being cooled.

Instead of relying upon time control by the timer, either an air temperature sensor disposed in the vicinity of the evaporator or an air temperature sensor disposed in the vicinity of the heater core may be used, and the amount of air flow from the air blower may be progressively increased until the air temperature detected by the selected sensor reaches a preset temperature.

According to the above control operation, hot air is prevented from entering the compartment when the compartment starts to be cooled.

With the aforesaid conventional air blower control; air is supplied at a breeze level for a constant period of time or until a single detected air temperature reaches a preset temperature. The amount of air may not be controlled at an appropriate level, however, if an ambient air temperature sensor is significantly affected by the heat of the engine while the automobile is at rest, at the time of restarting the engine when the compartment air temperature is substantially optimum and less than a substantial amount of cool air is required. For example, when the engine is restarted 10 to 20 minutes after it has been stopped, heat radiated by the engine is applied to the ambient air temperature sensor which is normally located on the back of the bumper near the engine, thereby increasing the temperature detected by the ambient air temperature sensor. As a result, the amount of air discharged into the cabin is undesirably increased, making the passengers uncomfortable.

SUMMARY OF THE INVENTION

In view of the aforesaid drawbacks of the conventional automobile air-conditioning apparatus, it is an object of the present invention to provide an automobile air-conditioning apparatus with air blower control which can progressively increase the amount of air discharged into an automobile passenger compartment when the air temperature in the compartment is almost optimal and comfort would be improved by avoiding delivery of a large amount of air into the compartment when starting the air-conditioning apparatus.

Another object of the present invention is to provide an automobile air-conditioning apparatus with air blower control which, when the temperature distribution in an automobile passenger compartment is uneven due for example to applied sunlight and a compartment air temperature sensor fails to represent a proper compartment air temperature, is capable of determining a gradient of increase of the amount of air to be delivered into the compartment when starting the air-conditioning apparatus, based on factors including the amount of applied sunlight.

According to the present invention, there is provided an automobile air-conditioning apparatus in an automobile having a passenger compartment, comprising: an intake damper openable and closable for controlling a first passage for introducing ambient air through duct means into the compartment and a second passage for circulating air in the compartment through the duct means; an air blower disposed in the duct means between the intake damper and the compartment for drawing air from said intake damper into the compartment; the air blower being connected to drive means for adjusting the amount of air fed by the air blower into the compartment; a cooling system including an evaporator disposed in the duct means between the air blower and the compartment; a heater core disposed in the duct means between the evaporator and the compartment for heating air that has passed through the evaporator; an air mixing damper disposed in the duct means between the evaporator and the heater core for controlling the amount of air that has passed through the evaporator and is to be fed to the heater core; a control system for controlling the amount of air fed from the air blower, the cooling system, and the amount of opening of the air mixing damper in response to a difference between a temperature preset by a temperature setting unit and the temperature of air in the compartment automatically adjust the temperature of air in the compartment; means for detecting a cooling starting time at which the compartment starts to be cooled; and a sunlight sensor for detecting an amount of sunlight applied to the automobile.

In one control mode, the control system controls driving means for the air blower from the time the compartment starts to be cooled, to progressively increase the amount of air from the air blower at a prescribed gradient from a prescribed low amount of air up to an amount of air in an automatic adjusting mode when the amount of sunlight is equal to or higher than a first prescribed value or the temperature of air in the compartment is equal to or higher than a second prescribed value, and the air temperature at the outlet of the evaporator is lower than a third prescribed value.

In another control mode, the control system controls driving means for the air blower from the time the compartment starts to be cooled, to maintain a prescribed low amount of air fed into the compartment for a prescribed period of time, and then to progressively increase the amount of air from the air blower at a prescribed gradient from the prescribed low amount of air up to an amount of air in an automatic adjusting mode when the amount of sunlight is equal to or higher than a first prescribed value or the temperature of air in the compartment is equal to or higher than a second prescribed value, and the air temperature at the outlet of the evaporator is equal to or higher a third prescribed value.

In still another control mode, the control system controls driving means for the air blower from the time the compartment starts to be cooled, to maintain a prescribed low amount of air fed into the compartment for a first prescribed period of time, and then to progressively increase the amount of air from the air blower at a first prescribed gradient from the prescribed low amount of air up to an amount of air in an automatic adjusting mode when the amount of sunlight is equal to or higher than a first prescribed value or the temperature of air in the compartment equal to or higher than a second prescribed value, and the air temperature at the outlet of the evaporator is equal to or higher a third prescribed value, and the control system also controls the driving means for the air blower from the time the compartment starts to be cooled, to maintain a prescribed low amount of air fed into the compartment second prescribed period of time, and then to progressively increase the amount of air from the air blower at a second prescribed gradient from the prescribed low amount of air up to an amount of air in an automatic adjusting mode when the amount of sunlight is lower than the first prescribed value and the temperature of air in the compartment is lower than the second prescribed value.

The above and other objects, features and advantages of the present invention will become more apparent from the following description when taken in conjunction with the accompanying drawings in which a preferred embodiment of the present invention is shown by way of illustrative example.

DETAILED DESCRIPTION OF THE PREFERRED EMBODIMENT

Figure 1:
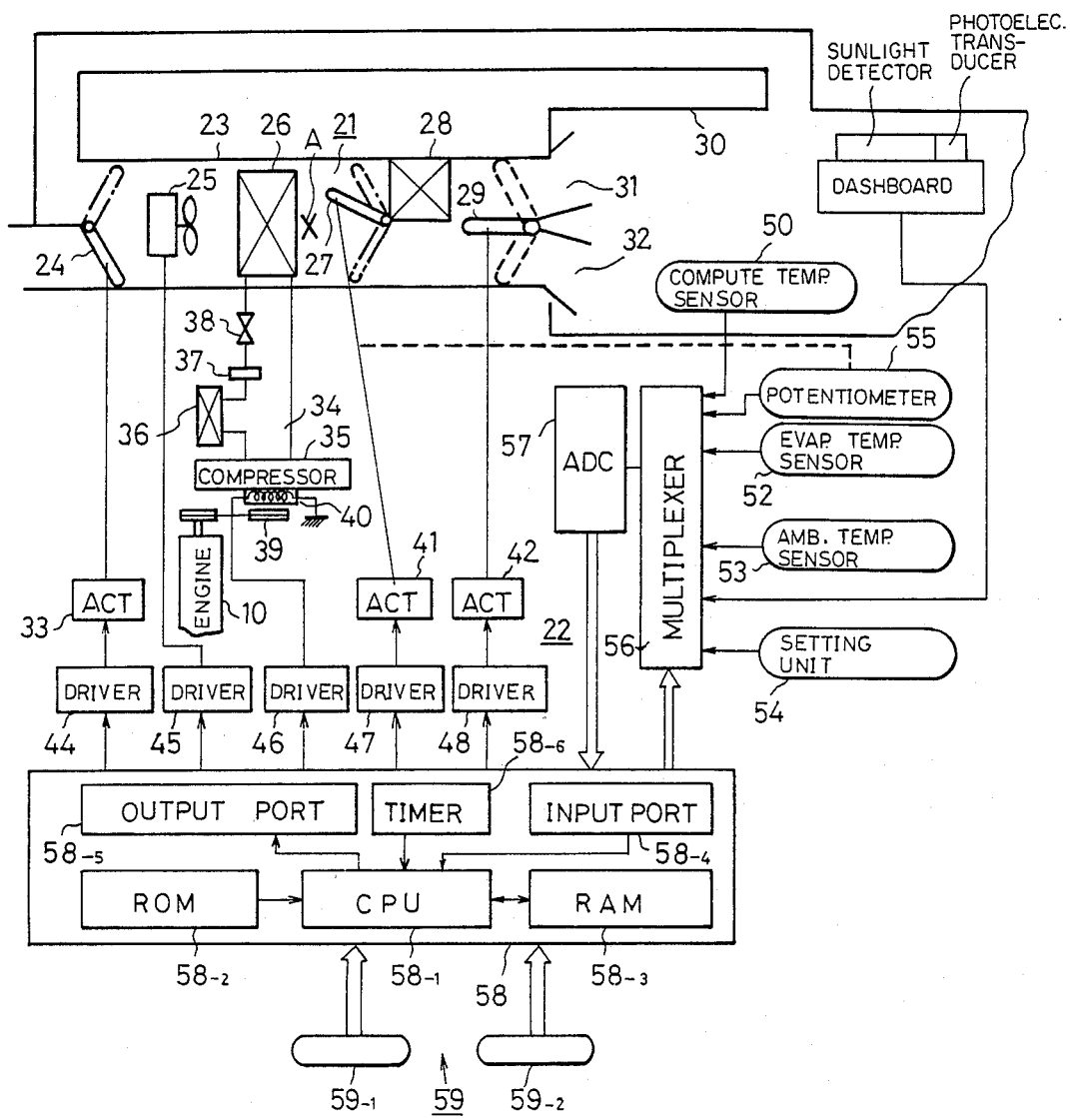
FIG. 1 is a block diagram of a control system in an automobile air-conditioning apparatus according to the present invention.

FIG. 1 shows an automobile air-conditioning apparatus according to the present invention. The air-conditioning apparatus includes an air-conditioning assembly 21 and a control system 22 comprising a microcomputer for controlling the air-conditioning assembly 21.

The air-conditioning assembly 21 comprises an intake damper 24 for drawing in air from the upstream end of a duct 23, an air blower 25 for feeding air from the intake damper 24 into an automobile passenger compartment or cabin 30, an evaporator 26, and an air mixing damper 27 for controlling the amount of air to be guided into a heater core 28 from the evaporator 26, the heater core 28 serving as a heater supplied with cooling water which has been heated by an internal combustion engine 10 mounted on the automobile. In the downstream end of the duct 23, there are provided a vent outlet 31 for discharging air into the automobile passenger compartment 30, a heated-air outlet 32 for discharging heated air into the automobile compartment 30, and a mode selector damper 29 for selecting one or both of the outlets 30, 31.

The intake damper 24 is controlled by a motor actuator 33 so that when the intake damper 24 is closed (full line position), air recirculates in the automobile cabin 30, and when the intake damper 24 is open (chain line position), fresh ambient air is introduced into the automobile compartment 30. The air introduced through the intake damper 24 by the air blower 25 passes through the evaporator 26 by which the air is cooled when a cooling unit 34 including the evaporator 26 is in operation. The cooling unit 34 is composed of the evaporator 26, a compressor 35, a condensor 36, a receiver tank 37, and an expansion valve 38, which are interconnected by a coolant pipe. The internal combustion engine 10 has an output shaft operatively coupled to a pulley 39 connected through a magnetic clutch 40 to the compressor 35. When the rotation of the pulley 39 is transmitted through the magnetic clutch 40 to the compressor 35, the compressor 35 compresses the coolant as it is fed through the coolant pipe.

The air mixing damper 27 is controlled by a motor actuator 41 to control the amount of air separated from the air which has passed through the evaporator 26 so as to direct it through the heater core 28.

The vent outlet 31 is positioned to direct air toward the face of the driver. The heated-air outlet 32 is positioned to direct hot air toward the feet of the driver. One or both of the outlets 31, 32 are selectively controlled by the mode selector damper 29 for discharging air into the automobile compartment 30. The mode selector damper 29 is driven by a motor actuator 42.

A compartment air temperature sensor 50 is positioned in the automobile compartment 30 at a location where the representative compartment air temperature can be detected. An evaporator temperature sensor 52 is provided for detecting the temperature of air which has passed through the evaporator 26, i.e., the temperature of air at a position A just downstream of the evaporator 26. An ambient air temperature sensor 53 is attached to the back surface of a bumper, for example. A sunlight sensor 51 which may include a photoelectric transducer element, for example, for detecting the amount of sunlight falling on the automobile is disposed on the dashboard. A temperature setting unit 54 is provided for establishing a temperature setting for the automobile compartment 30. The amount of opening of the air mixing damper 27 is electrically detected by a potentiometer 55.

The output signals from the compartment air temperature sensor 50, the sunlight sensor 51, the evaporator temperature sensor 52, the ambient air temperature sensor 53, the temperature setting unit 54, and the potentiometer 55 are supplied through a multiplexer 56 to an A/D converter (hereinafter referred to as "ADC") 57 by which the signals are converted to digital data items. The digital data items from the ADC 57 are delivered to a microcomputer 58. The microcomputer 58 is also supplied with outputs from a group of manual setting switches 59 including an air blower ON/OFF switch 59-1 and an air blower automatic mode setting switch 59-2.

The microcomputer 58 is connected through drivers 44, 45, 46, 47, and 48 to the motor actuator 33, the motor of the air blower 25, the magnetic clutch 40, the motor actuator 41, and the motor actuator 42, respectively, for energizing them with output signals applied through the drivers 44 through 48 from the microcomputer 58.

The microcomputer 58 is basically composed of a CPU 58-1, a ROM 58-2 for storing a program, a RAM 58-3, for storing data, an input port 58-4, an output port 58-5, and a timer 58-6. The microcomputer 58 operates according to the program stored in the ROM 58-2 to read in outputs from the manual setting switch group 59 and digital data from the ADC 57 through the input port 58-4 and then to process the supplied data in the CPU 58-1. The processed data is then applied through the output port 58-5 to the drivers 45 through 48 to control the amount of air delivered by the air blower 25, the timing and period of operation of the compressor 35 controlled through the magnetic clutch 40, the amount of opening of the air mixing damper 27, and the amount of opening of the intake damper 24 for thereby bringing the compartment air temperature to a preset temperature. The intake damper 24 is driven by the driver 44 energized by an output from a manual switch (not shown) to control the ratio between the amount of circulating air and the amount of introduced ambient air according to the setting of the manual switch which is applied via the driver 44.

Figure 2:
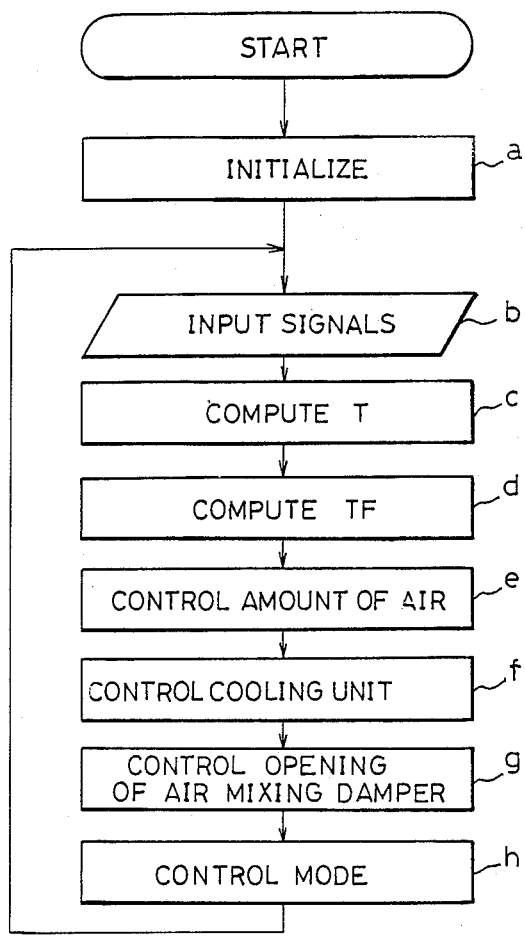
FIG. 2 is a flowchart of successive steps of operation of the control system shown in FIG. 1.

Controlling operation effected by the control system 22 under the direction of the program stored in the ROM 58-2 will be described with reference to the flowchart of FIGS. 2, 3(a) and 3(b).

When the program starts being executed, initialization is performed to clear the data stored in the RAM 58-3 in a step a. Then, the output signals, as converted into digital data, from the sensors 50 through 53, the setting unit 54, and the potentiometer 55, and the outputs from the manual setting switch group 59 are read into the microcomputer 58 through the input port 58-4 and temporarily stored in a given area in the RAM 58-3 in a step b. The microcomputer 58 then computes a compartment temperature control signal (hereinafter referred to as "combined data") T, which is stored (step c). The combined data T is computed according to the following equation:

$$T = T_R + K_1 T_E + K_2 T_A + K_3 T_S - K_4 T_D + K_5$$

where $T_R$ is the compartment air temperature detected by the compartment air temperature sensor 50, $T_E$ is the temperature of air detected by the evaporator temperature sensor 52 at the outlet of the evaporator 26, $T_A$ is the ambient air temperature detected by the ambient air temperature sensor 53, $T_S$ is the quantity of sunlight detected by the sunlight sensor 51, $T_D$ is the temperature setting established by the temperature setting unit 54, and $K_1$ through $K_5$ are constants. Therefore, the combined data T has a value related to the difference between the temperature setting $T_D$ and the compartment air temperature $T_R$, as corrected by the evaporator outlet temperature $T_E$, the sunlight quantity $T_S$, and the ambient temperature $T_A$. The combined data T can also be said to have a value related to the thermal load for controlling the compartment air temperature $T_R$ at the temperature setting $T_D$.

Then, data $T_F = T_E + K_6 \theta + \beta$ is computed and temporarily stored in a step d. $\theta$ indicates the amount of opening of the air mixing damper 27. The amount $\theta$ of opening of the air mixing damper 27 is 100% when all air which has passed through the evaporator 26 passes through the heater core 28. $K_6$ and $\beta$ represent constants. Thus, the data $T_F$ corresponds to the temperature of air which is discharged into the compartment 30, and is used as data for switching the mode selector damper 29.

Figure 4:
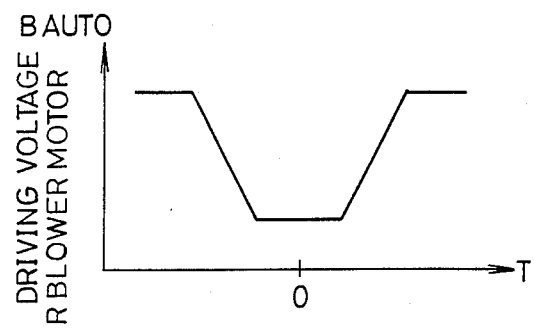
FIG. 4 is a graph showing the relationship between the voltage applied to an air blower motor and combined data after a starting control mode is ended.
Figure 5:
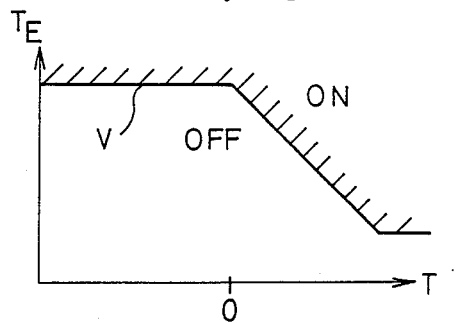
FIG. 5 is a graph illustrative of the relationship between the combined data and the air temperature at an evaporator outlet, showing cooling unit control operation.
Figure 6:
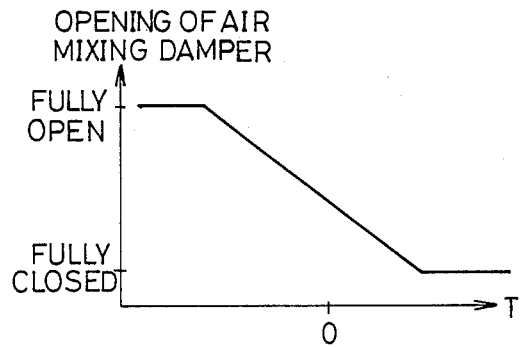
FIG. 6 is a graph showing the relationship between the combined data and the amount of opening of an air mixing damper, illustrating air mixing damper opening control operation.

The step d is followed by the control of the rate of air flow. The air flow rate control in an automatic control mode after a starting control mode has ended is effected in a step e by applying a driving voltage according to a prescribed control pattern as shown in FIG. 4 with respect to the combined data T, to the motor of the air blower 25. The step e is followed by a cooling unit control mode (step f) which controls the driving/nondriving of the cooling unit 34 and then an opening control mode (step g) which controls the amount of opening of the air mixing damper 27 that controls the amount of heat exchange with the heater core 28. In the cooling unit control mode, the magnetic clutch 40 is engaged when the evaporator outlet temperature $T_E$ is in excess of a temperature indicated by a curve V (FIG. 5) related to the combined data T, and the magnetic clutch 40 is disengaged when the evaporator outlet temperature $T_E$ is lower than the temperature represented by the curve V. The magnetic clutch 40 is engaged or disengaged through the driver 46. The air mixing damper 27 is adjusted by the driver 47 and the motor actuator 41 to an amount of opening according to a prescribed control pattern related to the combined data T, as shown in FIG. 6. The air mixing damper 27 can be fully open in order to cause all air which has passed through the evaporator 26 to pass through the heater core 28. The air mixing damper 27 can be fully closed in order to introduce all air which has passed through the evaporator 26 into the compartment 30 without going through the heater core 28.

After the step g, mode control is effected in a step h for controlling the mode selector damper 29 to open one or both of the vent outlet 31 and the heated-air outlet 32 according to the data $T_F$. If the data $T_F$ is below a prescribed value, a vent mode is carried out in which the vent outlet 31 is opened. Thereafter, control goes back to the step b.

Figure 3A:
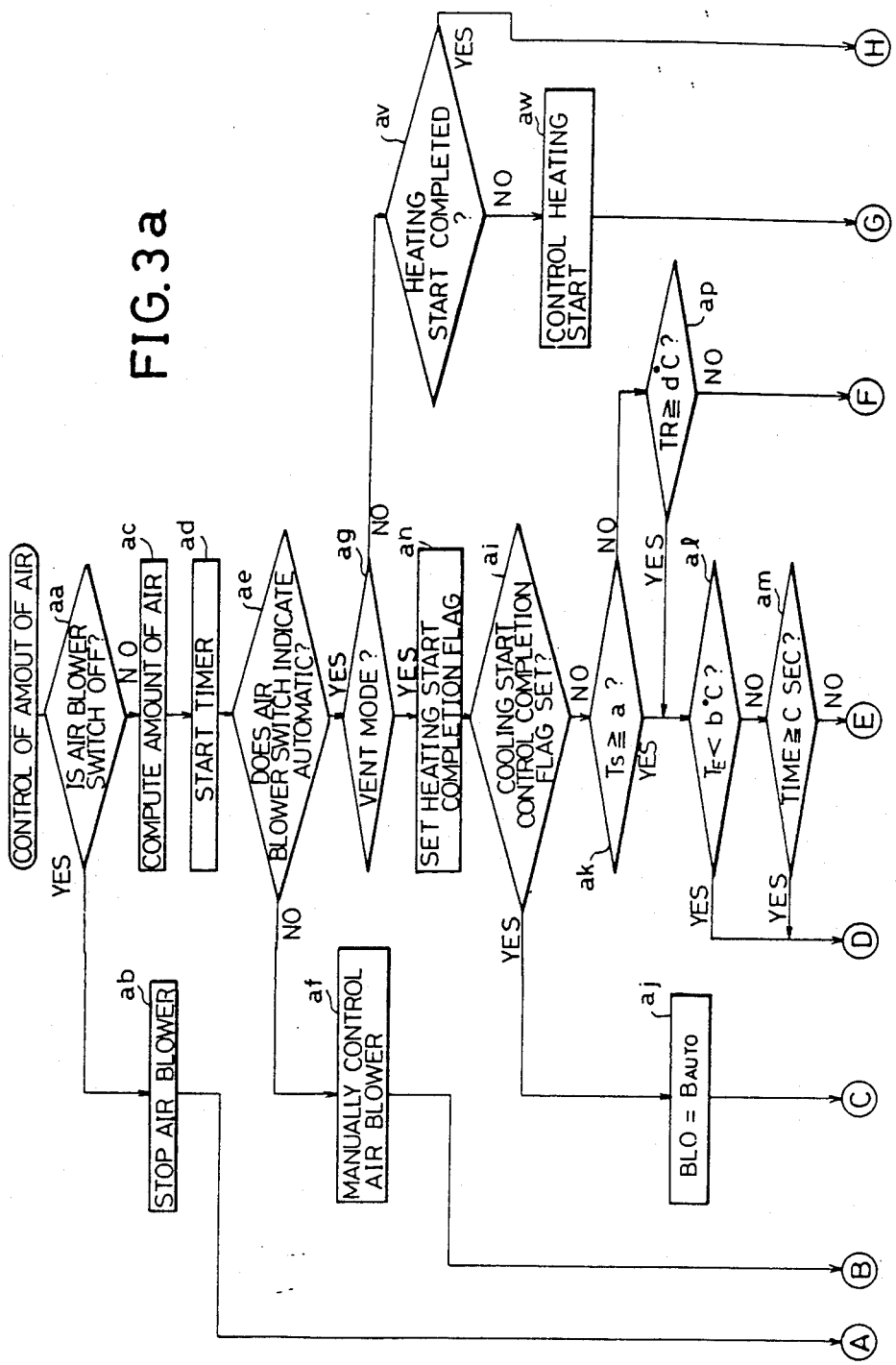
FIGS. 3(a) and 3(b) are a flowchart of air flow control effected by the control system illustrated in FIG. 1.
Figure 3:
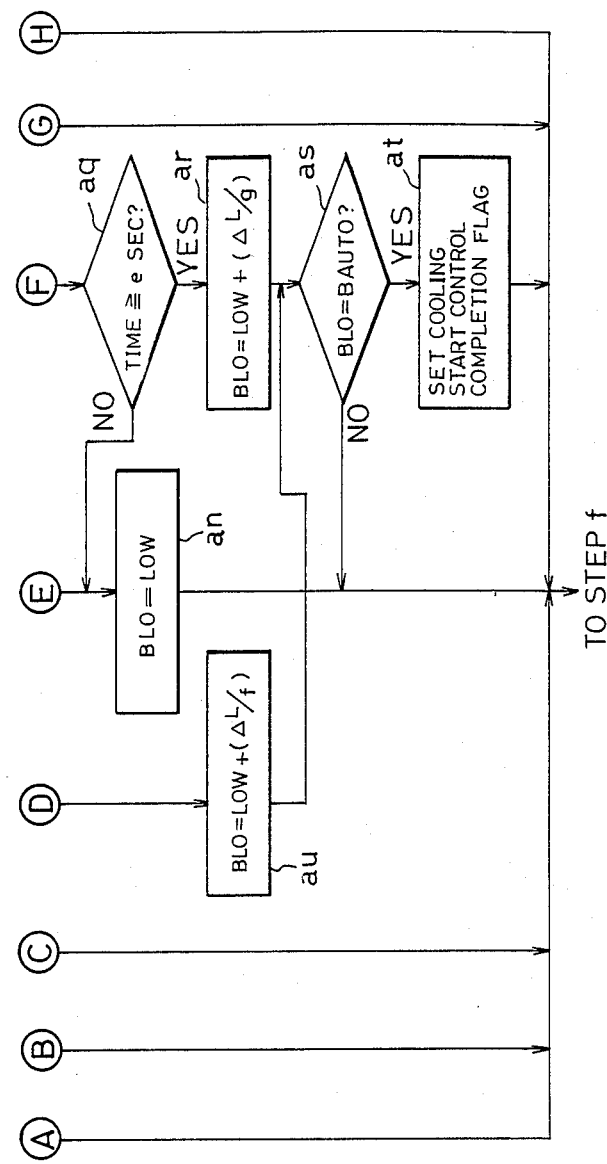

When control enters the air flow rate control mode in the step e, the air blower ON/OFF switch 59-1 is checked in a step aa (FIG. 3(a)). If the air blower on/off switch 59-1 is in an OFF condition, then the air blower 25 is stopped in a step ab, and the step f (FIG. 2) is executed, i.e., control goes back to the main routine. If the air blower ON/OFF switch 59-1 is in an ON condition in the step aa, then the amount of air with respect to the combined data T is computed according to the pattern of FIG. 4, and temporarily stored in a step ac. Control then goes from the step ac to a step ad in which the timer is started. Thereafter, a step ae checks if the air blower automatic mode selecting switch 59-2 indicates an automatic mode. If the automatic mode is not indicated, then the amount of air delivered by the air blower 25 is manually controlled in a step af, from which control returns to the main routine.

If the air blower automatic mode selecting switch 59-2 indicates the automatic mode, then whether the data $T_F$ is below a prescribed value is checked. If below, then a step ag ascertains whether the vent mode in which the vent outlet 31 is opened is effected. If the vent mode is effected, then a heating start completion flag is set in a step ah, and cooling is started. When the vent mode is effected, it is the same as if the cooling mode is indicated. The step ah is followed by a step ai which checks if a cooling start control completion flag that will be set in a step at is set or not. If not, the amount of air delivered into the compartment is progressively increased, as described later, until the cooling start control completion flag is set. Therefore, hot air is not discharged in a large amount when the cooling mode is started, and no unwanted odor is produced. If the cooling start control completion flag is set in the step ai, then a drive voltage BAUTO to be controlled to supply an amount of air in the automatic control mode, as computed in the step ac, is applied, as a drive voltage BLO, to the air blower motor in a step aj. Then, control goes back to the main routine.

If the cooling start control completion flag is not set in the step ai, then a step ak ascertains whether the detected amount of sunlight is equal to or higher than a prescribed value a or not. If equal to or higher than the prescribed value a, then a step al checks whether the air temperature $T_E$ at the evaporator outlet is below b° C. or not. If the detected amount of sunlight is not equal to or higher than the prescribed value a in the step ak, then a step ap ascertains whether the compartment air temperature $T_R$ is equal to or higher than d° C. or not. If the compartment air temperature $T_R$ is equal to or higher than d° C., then the step al is executed.

If the evaporator outlet air temperature $T_E$ is equal to or higher than b° C. in the step al, then a step am checks if the time period elapsed after the timer has started in the step ad is equal to or longer than c seconds or not. If the elapsed time period is shorter than c seconds in the step am, then a low drive voltage (Low) is applied to the air blower motor in a step an, from which control returns to the main routine.

If the compartment air temperature $T_R$ is lower than d° C. in the step ap, then control proceeds to a step aq which checks if the time period elapsed after the timer has started is equal to or longer than e seconds (e÷c). If not, then the step an is executed. If yes, then a voltage which is the sum of the low drive voltage (Low) and a drive voltage ( L/g) is applied to the air blower motor in a step ar, the drive voltage ( L/g) being added each time the step ar is executed. g indicates a constant. Therefore, the step ar is executed until the condition of a step as, described later, is met. The drive voltage applied to the air blower motor is incremented from the low voltage (Low) to the voltage (Low+ L/g) to the (Low+2 L/g), . . . , until finally the voltage BAUTO is reached. The step as checks if the drive voltage BLO is equal to the drive voltage BAUTO in the automatic control mode. If not, control returns to the main routine. If BLO=BAUTO, then the cooling start control completion flag is set in a step at, and then control goes back to the main routine.

If the evaporator temperature $T_E$ is below b° C. in the step al, or if the elaped time period is equal to or longer than c seconds in the step am, then control goes to a step au in which a voltage which is the sum of the low drive voltage (Low) and the drive voltage ( L/f) is applied to the air blower motor as in the step ar, the drive voltage ( L/f) being added each time the step au is executed. f indicates a constant. Thereafter, the step as is executed. Thus, by repeatedly executing the step au, the drive voltage applied to the air blower motor is incremented from the low voltage (Low) to the voltage (Low+ L/f) to the (Low+2 L/f), . . . In this case, the amount of sunlight $T_S$ is large, the compartment air temperature $T_R$ is high, and the evaporator outlet air temperature $T_E$ is low, so that f<g.

If the mode of discharging air into the compartment is not the vent mode in the step ag, then operation has not yet entered the cooling mode. The step ag is followed by a step av which checks if the heating start completion flag is set or not. If set, then control goes back to the main routine. If not set, then control proceeds to a step aw in which heating start control is effected by inhibiting air discharge into the compartment when the engine coolant serving as the heat source for the heater 28 has not been heated to a prescribed temperature, and by canceling air discharge inhibit when the temperature of the engine coolant exceeds the prescribed temperature. Control returns from the step aw to the main routine.

Figure 7A:
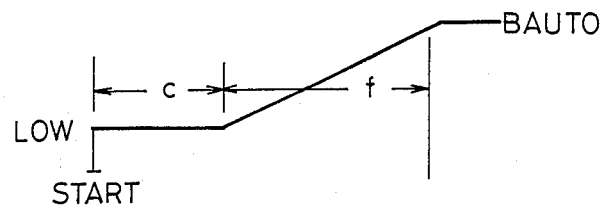
FIGS. 7(a) through 7(c) are graphs showing the relationship between the voltage applied to the air blower motor and time in a starting control mode.

When controlling operation is carried out according to the flowchart shown in FIGS. 2, 3(a) and 3(b), the amount of air delivered into the compartment when the compartment starts being cooled is controlled on the basis of the detected amount of sunlight $T_S$, the detected compartment air temperature $T_R$, and the detected evaporator outlet air temperature $T_E$, as follows:

(a) When $T_S \geq a°$ C. or $T_R \geq d°$ C. and $T_E \geq b°$ C., the amount of delivered air is low for c seconds, then progressively increases at the gradient of L/f, and is thereafter automatically controlled when it is equalized to the amount in the automatic control mode, as shown in FIG. 7(a).

Figure 7B:
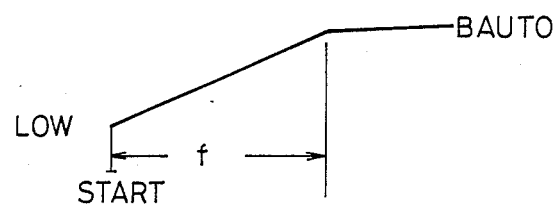

(b) When $T_S \geq a°$ C. or $T_R \geq d°$ C. and $T_E < b°$ C., the amount of delivered air progressively increases from the low level at the gradient of L/f, and is thereafter automatically controlled when it is equalized to the amount in the automatic control mode, as shown in FIG. 7(b).

Figure 7C:
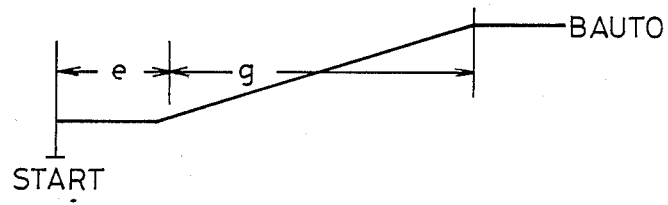

(c) When $T_S < a°$ C. and $T_R < d°$ C., the amount of delivered air is low for e seconds, then progressively increases at the gradient of L/g, and is thereafter automatically controlled when it is equalized to the amount in the automatic control mode, as shown in FIG. 7(c).

With the present invention, as described above, the time period elapsed until the amount of air delivered into the compartment in the automatic control mode is reached is substantially varied on the basis of the amount of applied sunlight, the compartment air temperature, and the evaporator outlet air temperature when the compartment starts being cooled. If the cabin air temperature, the amount of applied sunlight, and the evaporator outlet air temperature are greater than prescribed values, then the amount of air delivered into the compartment is increased quickly upon elapse of a prescribed interval of time. If the compartment air temperature and the amount of applied sunlight are greater than the prescribed values and the evaporator outlet air temperature is lower than the prescribed value, then the amount of air delivered into the compartment is increased quickly after the compartment cooling operation has started. Therefore, when a large amount of air is desired, the amount of delivered air is increased quickly. If a moderate increase in the amount of delivered air is desired when the compartment air temperature and the amount of applied sunlight are below the prescribed values, then the amount of delivered air is increased slowly. As a consequence, the amount of air delivered into the compartment can be controlled in various different manners.

The amount of sunlight is also used as one controlling factor. When the air-conditioning apparatus is restarted, and the compartment air temperature has an ununiform temperature distribution, so that the compartment air temperature sensor fails to represent the real air temperature in the compartment, the driver and passengers can feel comfortable since the gradient of increase of the amount of discharged air is determined also on the basis of the amount of applied sunlight.

Although a certain preferred embodiment has been shown and described, it should be understood that many changes and modifications may be made therein without departing from the scope of the appended claims.

We claim:

1. An air conditioning apparatus for a motor vehicle having a passenger compartment, said air conditioning apparatus comprising:
 a duct means extending from a position in the compartment and opening back into the compartment at another position and having a first passage opening into said duct means from outside the apparatus;
 an intake damper in said duct means at said first passage and movable for controlling the amount of ambient air introduced into said duct means and the amount of air circulating from the compartment through said duct means;
 an air blower disposed in said duct means between said intake damper and the compartment for drawing air from the position of said intake damper and supplying such air into the compartment, and drive means connected to said air blower for adjusting the operation of said air blower for adjusting an amount of air fed by said air blower into the compartment;
 a cooling system including an evaporator disposed in said duct means between said air blower and the compartment;
 a heater core disposed in said duct means between said evaporator and the compartment for heating air that has passed through said evaporator;
 an air mixing damper means disposed in said duct means between said evaporator and said heater core and movable for controlling the amount of air that has passed through said evaporator and is to be fed to said heater core;
 a temperature setting unit;
 a compartment temperature detector in the compartment;
 means for recognizing the first time at which the cooling cycle of said cooling system is started after the air conditioning apparatus has started to operate;
 a sunlight detector for detecting an amount of sunlight applied to the motor vehicle; and
 a control system to which said temperature setting unit, said compartment temperature sensor, said recognizing means and said sunlight detector are connected and connected to said air blower driving means, said air mixing damper, and said evaporator for controlling an amount of air fed from said air blower, controlling said cooling system and said air mixing damper in response to any difference between a temperature preset by said temperature setting unit and the temperature of the air in the compartment to automatically adjust the temperature of air in the compartment in an automatic adjusting mode which is controlled dependent on the difference between the temperature preset by said temperature setting unit and the temperature of air in the compartment, and further controlling said air blower driving means in a first gradient mode the first time the cooling cycle is started to maintain a prescribed low amount of air fed into the compartment for a first prescribed period of time and then to progressively increase the amount of air from said air blower at a first prescribed gradient with respect to time from the prescribed low amount of air up to an amount of air which is the same as the amount of air from the blower when said apparatus is operating in said automatic adjusting mode, said further controlling of said air blower being when the amount of sunlight is at least equal to a first prescribed value or the temperature of air in the compartment is at least equal to a second prescribed value, and the air temperature at the outlet of said evaporator is at least equal to third prescribed value, still further controlling said air blower driving means in a second gradient mode the first time the cooling cycle is started to progressively increase the amount of air from said air blower from the prescribed low amount of air up to an amount of air which the same as the amount of air from the blower when the apparatus is operating in said automatic adjusting mode, said still further controlling of the blower being when the amount of sunlight is at least equal to the first prescribed value or the temperature of the air in the compartment is at least equal to the second prescribed value, and the air temperature at the outlet of said evaporator is lower than a third prescribed value, and yet further controlling said air blower driving means in a third gradient mode the first time the cooling cycle is started to maintain a prescribed low amount of air fed into the compartment for a second prescribed period of time and then to progressively increase the amount of air from said air blower at a third prescribed gradient with respect to time from the prescribed low amount of air up to an amount of air which is the same as the amount of air from the blower when said apparatus is operating in said automatic adjusting mode, said lastmentioned controlling of said air blower being when the amount of sunlight is lower than said first prescribed value and the temperature of the air in the compartment is lower than said second prescribed value.

2. An air conditioning apparatus as claimed in claim 1, wherein said sunlight detector is mounted on a dashboard of the motor vehicle.

3. An air conditioning apparatus as claimed in claim 1, wherein said sunlight detector includes a photoelectric transducer.

* * * * *